(12) United States Patent
Ferren et al.

(10) Patent No.: US 9,820,008 B2
(45) Date of Patent: Nov. 14, 2017

(54) CAPTURE AND RECALL OF HOME ENTERTAINMENT SYSTEM SESSION

(75) Inventors: Bran Ferren, Beverly Hills, CA (US); Cory J. Booth, Beaverton, OR (US); Genevieve Bell, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 544 days.

(21) Appl. No.: 13/819,244

(22) PCT Filed: Aug. 25, 2011

(86) PCT No.: PCT/US2011/049199
§ 371 (c)(1),
(2), (4) Date: Aug. 20, 2013

(87) PCT Pub. No.: WO2012/027597
PCT Pub. Date: Mar. 1, 2012

(65) Prior Publication Data
US 2013/0332535 A1  Dec. 12, 2013

Related U.S. Application Data

(60) Provisional application No. 61/377,588, filed on Aug. 27, 2010.

(51) Int. Cl.
*H04N 7/18* (2006.01)
*H04N 7/173* (2011.01)
(Continued)

(52) U.S. Cl.
CPC .............. *H04N 21/632* (2013.01); *G01S 5/20* (2013.01); *G06F 3/017* (2013.01); *G06F 3/0346* (2013.01);
(Continued)

(58) Field of Classification Search
CPC ............. H04N 21/42204; H04N 21/45; H04N 21/4508; H04N 21/4516
(Continued)

(56) References Cited

U.S. PATENT DOCUMENTS

| 7,024,256 B2 | 4/2006 | Krzyzanowski et al. |
| 2003/0066080 A1* | 4/2003 | Kamieniecki ...... H04N 5/44513 725/80 |

(Continued)

FOREIGN PATENT DOCUMENTS

| JP | 2000-347970 | 12/2000 |
| KR | 2007-0016284 | 2/2007 |
| WO | 2006133737 | 12/2006 |

OTHER PUBLICATIONS

Exended European Search Report received for European Patent Application No. 11820669.7, dated Jan. 26, 2015, 9 pages.

(Continued)

*Primary Examiner* — James R Sheleheda

(57) ABSTRACT

Various embodiments are directed to systems and methods for determining the current state of multiple devices that form the basis of a home entertainment system. A user may be utilizing one or more devices in the home entertainment system when an interruption occurs which may divert the user's attention away from the home entertainment system for an extended period of time. In such circumstances, the user may wish to easily store the settings of all the devices currently in use such that the session can be saved for future recall. There is no need to remember the individual device settings. The session may be stored and associated with a graphical user interface (GUI) icon and made available for later recall. When the user returns, she simply may select the GUI icon for the particular session to be restored. Other embodiments are described and claimed.

20 Claims, 10 Drawing Sheets

(51) Int. Cl.
| | | |
|---|---|---|
| H04N 21/63 | (2011.01) | |
| H04N 21/437 | (2011.01) | |
| G06F 3/041 | (2006.01) | |
| H04N 21/422 | (2011.01) | |
| H04N 21/45 | (2011.01) | |
| G06K 9/32 | (2006.01) | |
| H04N 5/445 | (2011.01) | |
| H04N 21/431 | (2011.01) | |
| H04N 21/654 | (2011.01) | |
| G08C 17/00 | (2006.01) | |
| G08C 17/02 | (2006.01) | |
| G08C 19/00 | (2006.01) | |
| G06F 3/048 | (2013.01) | |
| G06N 5/02 | (2006.01) | |
| G01S 5/20 | (2006.01) | |
| H04N 21/488 | (2011.01) | |
| H04N 5/91 | (2006.01) | |
| H04N 5/44 | (2011.01) | |
| G06F 3/0485 | (2013.01) | |
| H04L 29/06 | (2006.01) | |
| G06Q 30/02 | (2012.01) | |
| H04N 21/436 | (2011.01) | |
| H04N 21/443 | (2011.01) | |
| G06F 3/01 | (2006.01) | |
| G06F 3/038 | (2013.01) | |
| G06F 3/0482 | (2013.01) | |
| G06F 3/0481 | (2013.01) | |
| H04N 21/482 | (2011.01) | |
| G06F 3/0346 | (2013.01) | |
| H04N 21/4147 | (2011.01) | |
| H04N 21/433 | (2011.01) | |
| H04N 21/81 | (2011.01) | |
| H04N 21/475 | (2011.01) | |

(52) U.S. Cl.
CPC ............ *G06F 3/0383* (2013.01); *G06F 3/041* (2013.01); *G06F 3/048* (2013.01); *G06F 3/0414* (2013.01); *G06F 3/0481* (2013.01); *G06F 3/0482* (2013.01); *G06F 3/0485* (2013.01); *G06K 9/3266* (2013.01); *G06N 5/02* (2013.01); *G06Q 30/0201* (2013.01); *G08C 17/00* (2013.01); *G08C 17/02* (2013.01); *G08C 19/00* (2013.01); *H04L 65/403* (2013.01); *H04N 5/4403* (2013.01); *H04N 5/44504* (2013.01); *H04N 5/91* (2013.01); *H04N 21/4147* (2013.01); *H04N 21/42204* (2013.01); *H04N 21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4508* (2013.01); *H04N 21/4516* (2013.01); *H04N 21/4532* (2013.01); *H04N 21/482* (2013.01); *H04N 21/4882* (2013.01); *H04N 21/63* (2013.01); *H04N 21/654* (2013.01); *G08C 2201/32* (2013.01); *G08C 2201/40* (2013.01); *H04N 21/4755* (2013.01); *H04N 21/8133* (2013.01); *H04N 2005/44556* (2013.01)

(58) Field of Classification Search
USPC .................................. 725/80, 133, 141, 153
See application file for complete search history.

(56) References Cited

U.S. PATENT DOCUMENTS

| | | | |
|---|---|---|---|
| 2004/0124247 A1* | 7/2004 | Watters | H04L 67/08 235/492 |
| 2009/0190150 A1 | 7/2009 | Selvaraj et al. | |
| 2010/0014834 A1 | 1/2010 | Flynn | |
| 2010/0052843 A1* | 3/2010 | Cannistraro | 340/3.32 |
| 2010/0070909 A1 | 3/2010 | Biltz et al. | |
| 2010/0169946 A1* | 7/2010 | Stanley | H04N 5/4403 725/152 |
| 2010/0211636 A1 | 8/2010 | Starkenberg et al. | |
| 2011/0134326 A1 | 6/2011 | Nakayama | |
| 2013/0133022 A1* | 5/2013 | Bi | H04N 21/4432 725/152 |

OTHER PUBLICATIONS

Office Action received for Korean Patent Application No. 2013-7007709, dated Feb. 28, 2014, 4 pages English translation.
International Search Report and Written Opinion received for PCT Patent Application No. PCT/US2011/049199, dated Mar. 26, 2012, 10 pages.

* cited by examiner

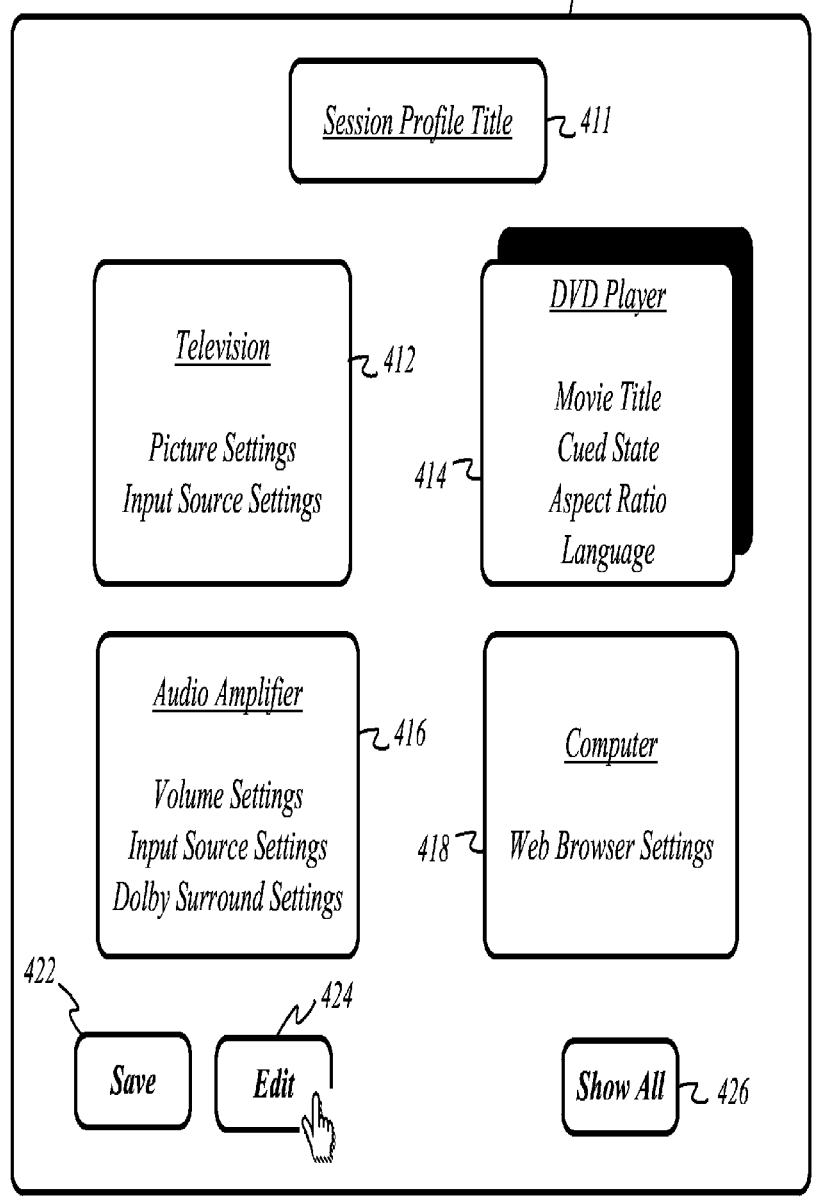

User Interface View 450

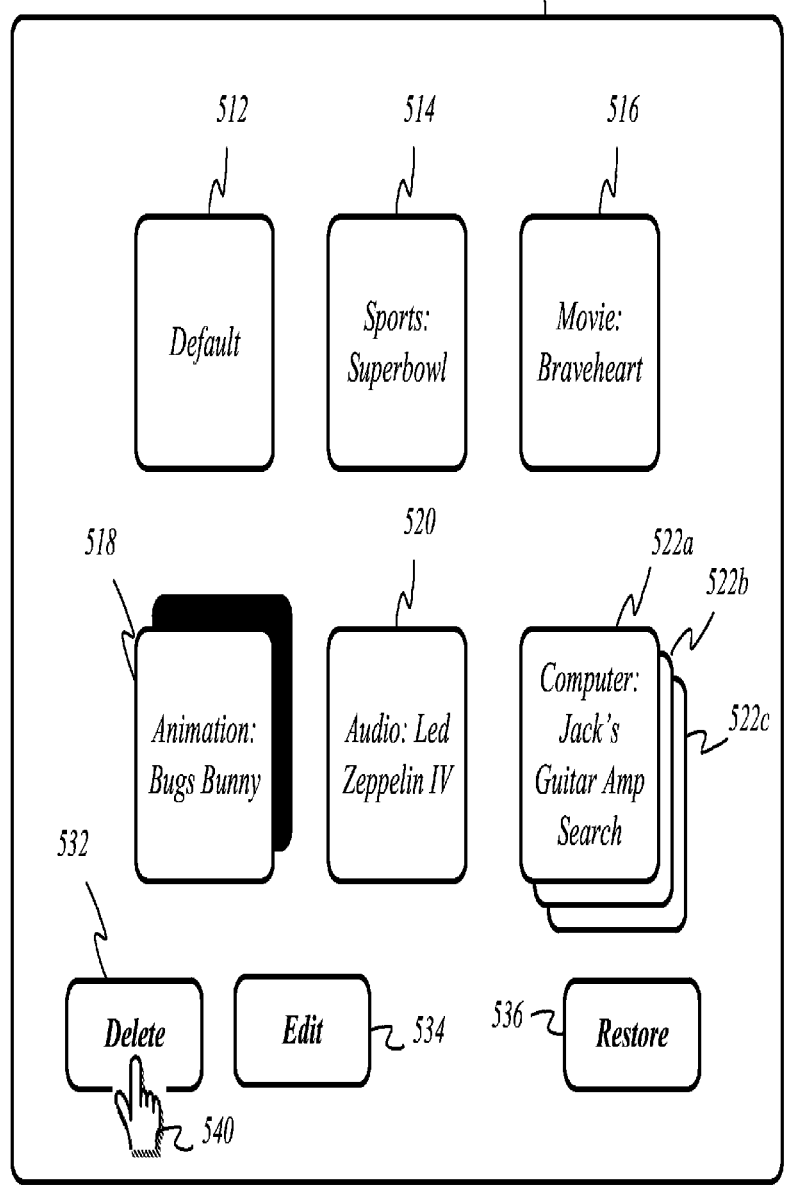

CAPTURE AND RECALL OF HOME ENTERTAINMENT SYSTEM SESSION

RELATED APPLICATIONS

This application claims priority to U.S. Provisional Patent Application Ser. No. 61/377,588 filed Aug. 27, 2010, which is incorporated herein by reference in its entirety.

BACKGROUND

The ongoing convergence of internet and television presents the home entertainment consumer with an ever-widening range of entertainment options. Indeed, the rise of the "media PC" and the "home entertainment operating system" is testament to both the flexibility with which users can send, store, and receive entertainment programming as well as the wide array of tools with which users can interact with the programming and with one another. Consequently, home entertainment "sessions" are increasingly elaborate and complex. Configuring a home entertainment system in a desired manner is no longer simply a matter of selecting the channel of interest and adjusting the volume the desired level. Locating and selecting content of interest, opening network connections and communication channels, and adjusting display and audio settings is a substantial effort that many users find cumbersome.

Accordingly, there may be a need for improved techniques to solve these and other problems.

BRIEF DESCRIPTION OF THE DRAWINGS

FIG. 4 illustrates an embodiment of a user interface view.

FIG. 5 illustrates an embodiment of a user interface view.

DETAILED DESCRIPTION

Figure 1:
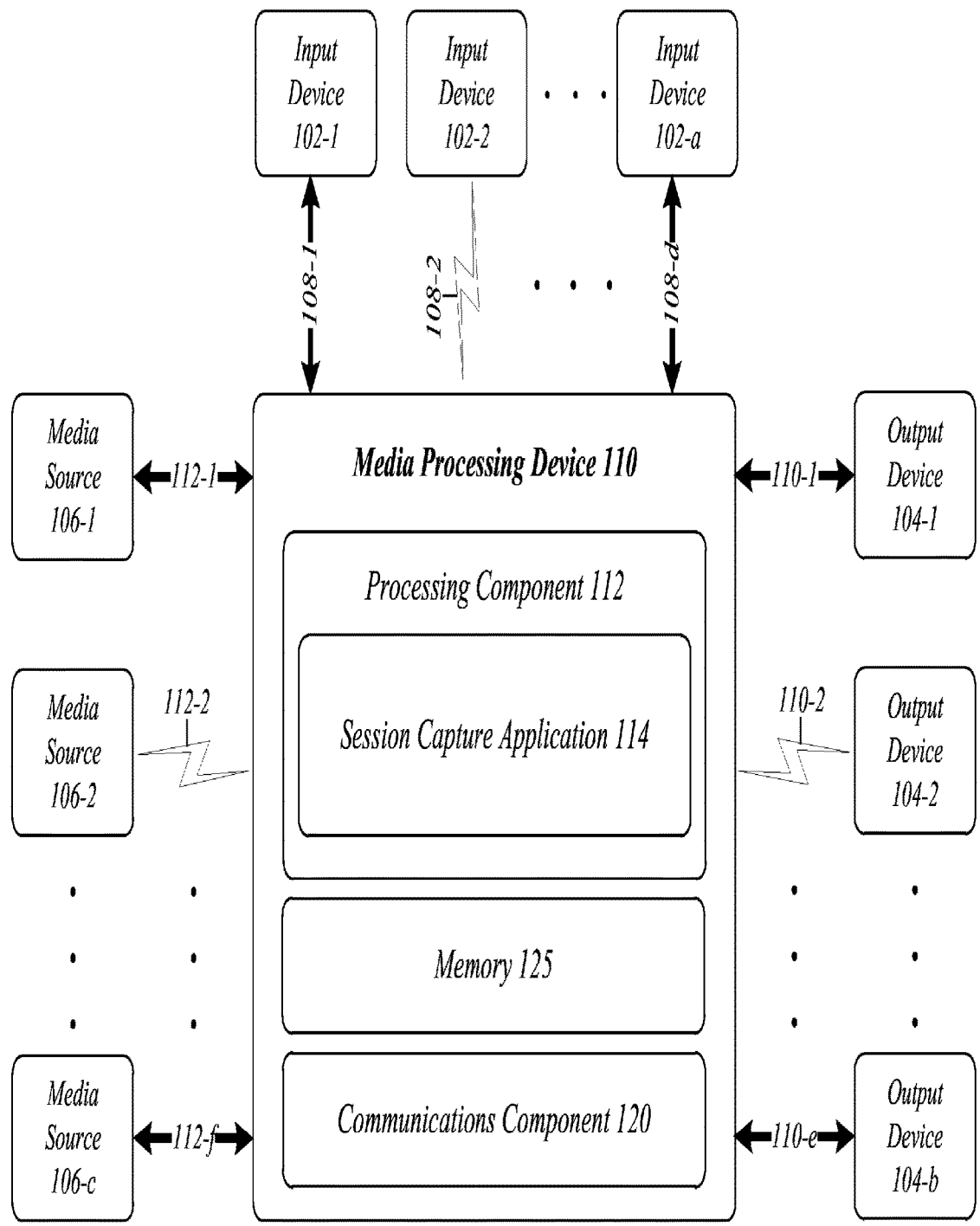
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And, from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in an functionally seamless and easily understood manner.

The digital home system may include, in various embodiments, a multi-axis integrated on-screen navigation component allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output devices may also be incorporated into the digital home system in various embodiments to further enhance the intuitive user interactions, ease of use and overall quality of the system. The embodiments are not limited in this context.

Various embodiments are directed to systems and methods for determining the current state of multiple devices that form the basis of a home entertainment system. A user may be utilizing one or more devices in the home entertainment system when an interruption occurs which may divert the user's attention away from the home entertainment system for an extended period of time. In such circumstances, the user may wish to easily store the settings of all the devices currently in use such that the session can be saved for future recall. There is no need to remember the individual device settings. The session may be stored and associated with a graphical user interface (GUI) icon and made available for later recall. When the user returns, she simply may select the GUI icon for the particular session to be restored. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-c) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-a, one or more output devices 104-b, and one or more media sources 106-c. The media processing device 110 may be communicatively coupled to the input devices 102-a, the output devices 104-b, and the media sources 106-c via respective wireless or wired communications connections 108-d, 110-e and 112-f.

It is worthy to note that "a" and "b" and "c" and similar designators as used herein are intended to be variables representing any positive integer. Thus, for example, if an implementation sets a value for a=5, then a complete set of input devices 102-a may include computing devices 102-1, 102-2, 102-3, 102-4 and 102-5. The embodiments are not limited in this context.

In various embodiments, the media processing system 100 may include one or more input devices 102-a. In general, each input device 102-a may comprise any component or device capable of providing information to the media processing device 110. Examples of input devices 102-a may include without limitation remote controls, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-b. An output device 104-b may comprise any electronic device capable of reproducing, rendering or presenting media content for consumption by a human being. Examples of output devices 104-b may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

While various embodiments refer to input devices 102-a providing information to media processing device 110 and output devices 104-b receiving information from media processing device, it should be understood that one or more of the input devices 102-a and output device 104-b may allow for the exchange of information to and from media processing device 110 via their respectively connections 108-d and 110-e. For example, one or more of input devices 102-a may be operative to provide information to media processing device 110 and to receive information from media processing device 110. In various embodiments, one or more of output devices 104-b may be operative to receive information from media processing device 110 and may also be operative to provide information to media processing device 110. Similarly, there may be a bi-directional exchange between the media processing device 110 and media sources 106-c. For instance, a media source 106-c may be operative to provide media information to the media processing device 110 and to receive information from the media processing device 110. An example of this would be a video on demand (VOD) application implemented by the media processing device 110. The embodiments are not limited in this context.

In one embodiment, for example, the media processing system 100 may include a display 104-1. The display 104-1 may comprise any analog or digital display capable of presenting media information received from media sources 106-c. The display 104-1 may display the media information at a defined format resolution. In various embodiments, for example, the incoming video signals received from media sources 106-c may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720 p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-*c* may be internal or external to media processing device 110, depending upon a given implementation. The embodiments are not limited in this context.

In various embodiments, the media processing system 100 may include one or more media processing devices 110. The media processing device 110 may comprise any electronic device arranged to receive, process, manage, and/or present media information received from media sources 106-*c*. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a digital display, an analog display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth.

By way of example, and not limitation, communication media 120 includes wired communications media and wireless communications media, as previously described.

In various embodiments, the media processing device 110 may comprise a session capture application 114. Session capture application 114 is shown as part of media processing device 110 for purposes of illustration and not limitation. It should be understood that session capture application 114 could be located in other devices, components or nodes of media processing system 100 in various embodiments and still fall within the described embodiments.

In one embodiment, the processing component 112 may optionally implement the session capture application 114. The session capture application 114 may initiate a session save of current device settings for the multiple devices communicable with the media processing device 110 in response to a control directive received from a remote control device or other input device 102-*a*. The session capture application 114 may then create a session profile representative of the current device settings for the multiple devices. The session capture application 114 may then determine the current device settings for all active devices and may store data representative of the current device settings in memory 125. The session capture application 114 may then access the current device settings data stored in memory 125 and write the current device settings data to a session profile record comprised of fields representative of device settings. The session profile record may be stored in memory 125 that may include a database structure. The database structure may include, but is not limited to, fields representative of a powered state of a device, a volume state of a device, a tuned state of a device, picture settings of a device, a device mode, a cued state of a program, applications executing in a computer device, windows executing and files open in a computer device, tabs open in a web browser of a computer device, universal resource locators (URLs) open in a computer device, and a session profile title. In addition, the session capture application 114 may then store the session profile record in memory along with an associated graphical user interface (GUI) icon. The GUI icon may be displayable to a user and selectable by a received control directive issued from an input device 102-*a*. Upon selection of the GUI icon the session capture application 114 may then create and send one or more control directives to the devices with instructions to restore the devices to the settings contained in session profile record. The session profile record and associated GUI icon may also be packaged and sent to other users using an email system or other file transfer protocol. The embodiments are not limited to this example.

Figure 2:
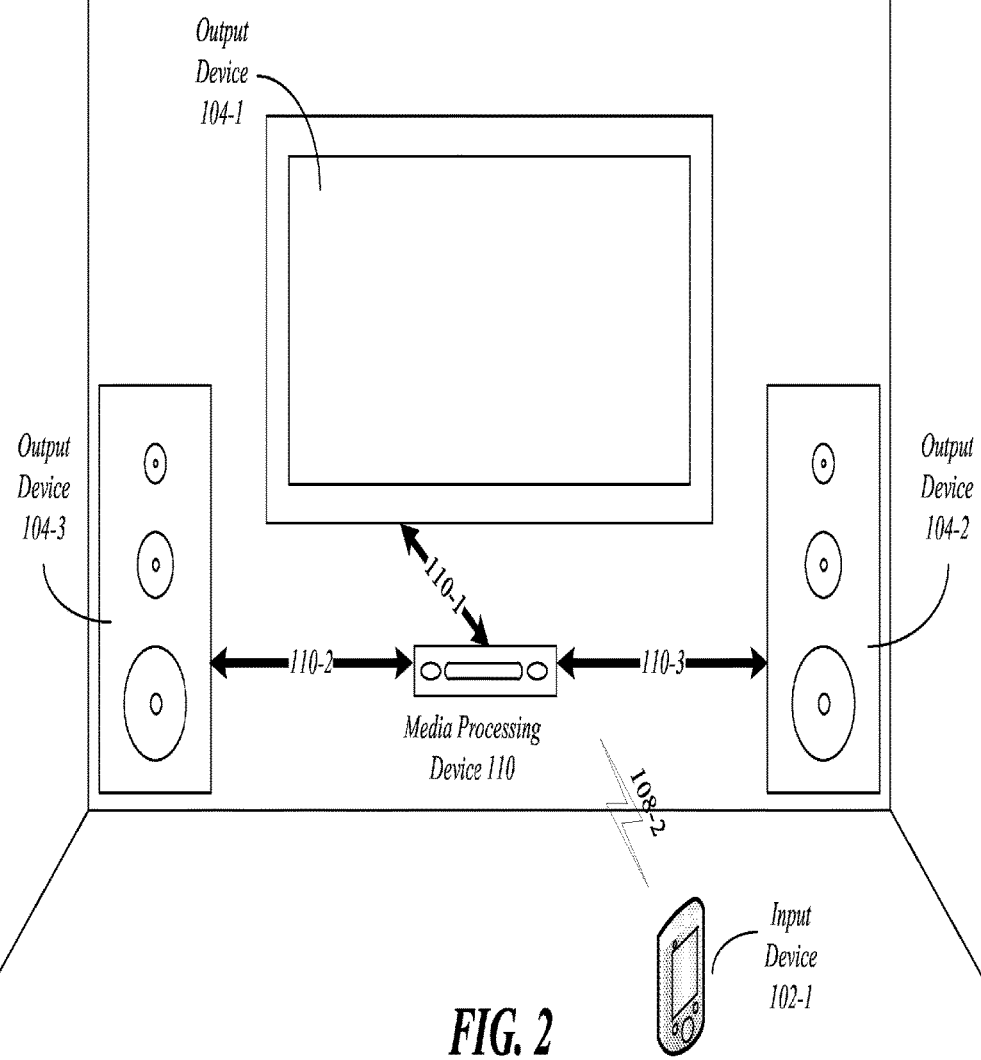
FIG. 2 illustrates one embodiment of a media processing component.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, and one or more media sources 106 (not shown).

The media processing device 110 may be communicatively coupled to the input device 102-1, the output devices 104-1, 104-2 and 104-3, and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3A:
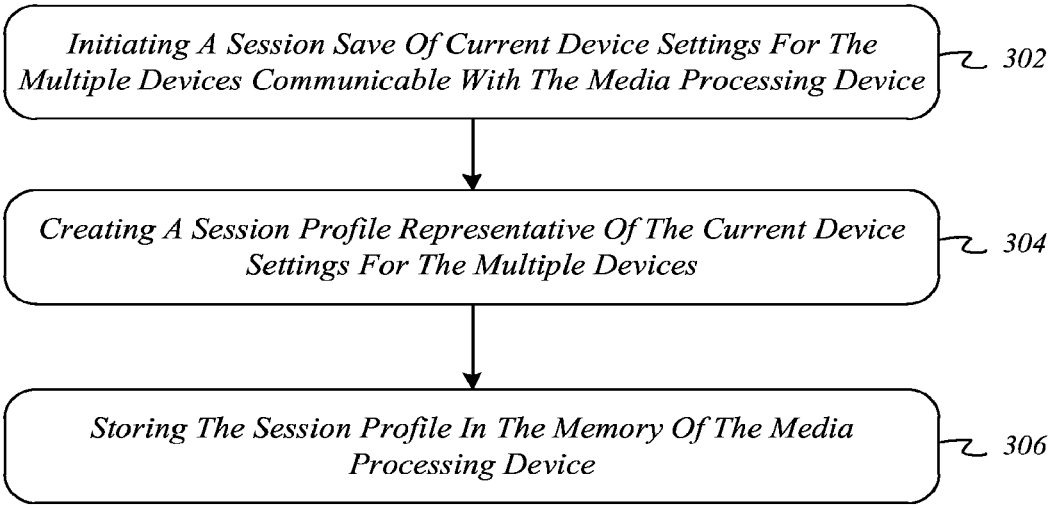
FIG. 3a illustrates one embodiment of a logic flow.

FIG. 3a illustrates one embodiment of a logic flow 300. The logic flow 300 may be representative of some or all of the operations executed by one or more embodiments described herein.

In the illustrated embodiment shown in FIG. 3a, the logic flow 300 may initiate a session save of current device settings for the multiple devices 102-a, 104-b, 106-c communicable with a media processing device 110 at block 302. For example, the session capture application 114 may initiate a session save upon reception of a control directive from a remote control device (e.g., a specific type of input device 102-1) communicable with the media processing device 110. Alternatively, the session capture application 114 may initiate a session save upon detecting actuation of a button on a media processing device 110. The button may be hard-wired to take the place or supplement the control directive described above. The embodiments are not limited to this example.

The logic flow 300 may create a session profile representative of the current device settings for the multiple devices 102-a, 104-b, 106-c at block 304. For example, the session profile may determine and store data representative of various individual device settings for each of the multiple devices 102-a, 104-b, 106-c that are known to the session capture application 114. It may be that not all devices known to the session capture application 114 may be in use at the moment. The device settings that are determined may then be stored as a session profile. For devices that may not be currently in use, a data field for a powered state of a device in a session profile record may be set to "off". A more detailed description of data fields and session profile records is set out below. Alternatively, a device not currently in use may be indicated with a "no state saved" in a session profile record. The embodiments are not limited to this example.

The logic flow 300 may store the session profile in the memory of the media processing device 110 at block 306. For example, the session profile may be stored in memory 125 within the media processing device 110 along with a GUI icon representative of and associated with the session profile. The GUI icon can be specifically labeled such as, for instance, "Movie: Braveheart" or "Mom's Movie Settings" or "Dad's Sports Settings" or "Sports: Superbowl" or "Animation: Bugs Bunny" or "Audio: Led Zeppelin IV" or "Computer: ITunes" or "Computer: Jack's Guitar Amp Search". Each of the aforementioned GUI icons may be associated with session profiles of stored device setting data tailored to a user's preferences for that particular content. The GUI icon may be displayable by the media processing device 110 via a display device (e.g., one of the output devices 104-1) controllable by the media processing device 110. Via the session capture application 114, a user can request the media processing device 110 to display GUI icons for a current set of session profiles. The GUI icons may be stored and presented using folders, directories, file lists, etc. The GUI icons may be selectable by a user such that selection of a GUI icon will initiate a restoration of the devices referenced in the session profile to the device settings contained in the session profile. The embodiments are not limited to this example.

Figure 3B:
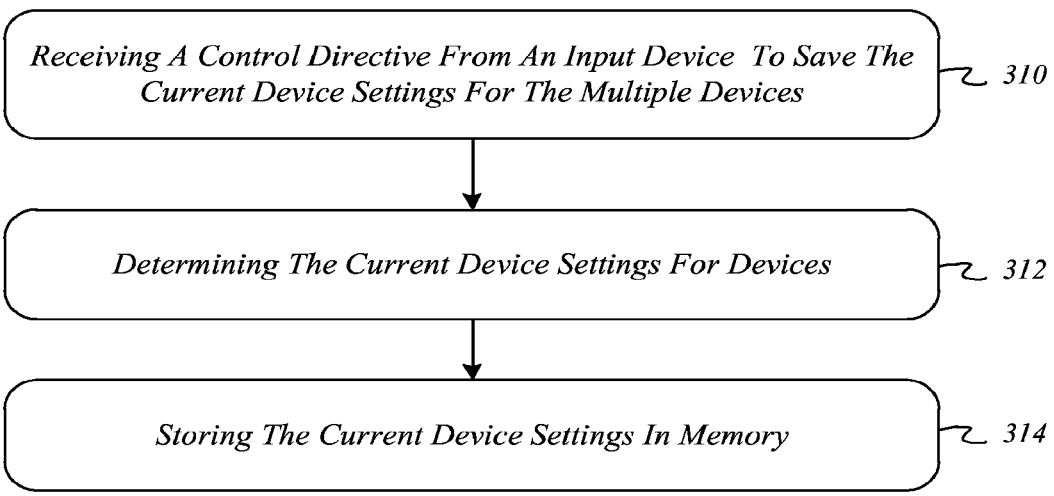
FIG. 3b illustrates one embodiment of a logic flow.

FIG. 3b illustrates one embodiment of a logic flow for block 302 of FIG. 3a. The logic flow 302 may be representative of some or all of the operations executed by one or more embodiments described herein.

The logic flow 302 may receive a control directive from an input device 102-1 (e.g., a remote control device) to save the current device settings for the multiple devices 102-a, 104-b, 106-c at block 310. The logic flow 302 may respond to the control directive and may determine the current device settings for the multiple devices 102-a, 104-b, 106-c at block 312, and may store data representative of the current device settings in memory 125 at block 314. For example, the session capture application 114, upon receipt of a control directive, may cause the media processing device 110 to communicate with each device 102-a, 104-b, 106-c under its control to determine the current device settings of a particular device 102-a, 104-b, 106-c. The current device settings data for each device 102-a, 104-b, 106-c may then be stored in memory 125. The embodiments are not limited to this example.

Figure 3C:
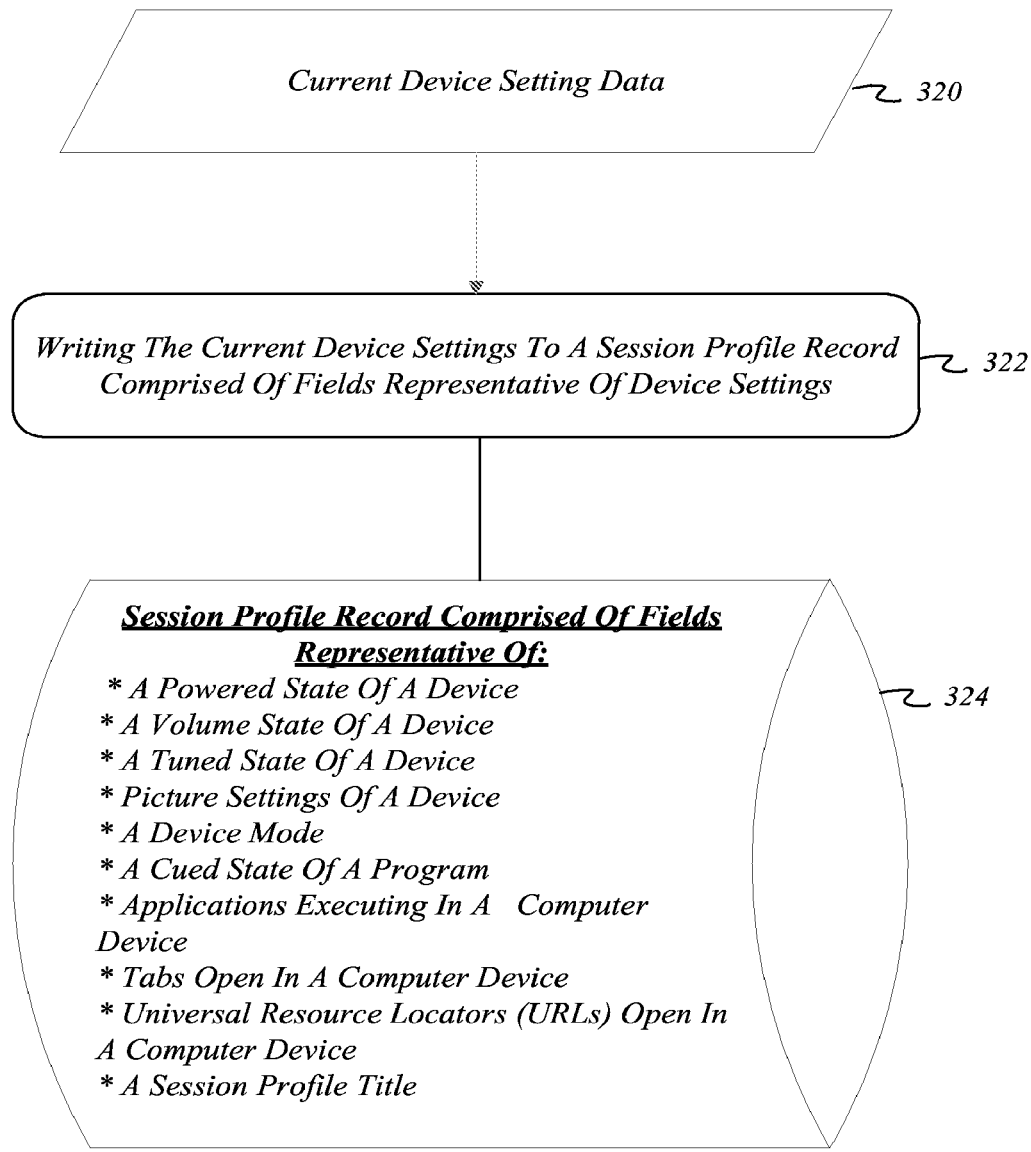
FIG. 3c illustrates one embodiment of a logic flow.

FIG. 3c illustrates one embodiment of a logic flow for block 304 of FIG. 3a. The logic flow 304 may be representative of some or all of the operations executed by one or more embodiments described herein.

The logic flow 304 may access the current device settings data stored in memory 125 by block 314 of FIG. 3b at block 320. The logic flow 304 may then write the current device settings data to a session profile record comprised of fields representative of device settings at block 322. For example, a database 324 may include, but is not limited to, fields representative of a powered state of a device, a volume state of a device, a tuned state of a device, picture settings of a device, audio settings of a device, input source for a device, a cued state of a program, computer device status (e.g., applications executing, tabs open, universal resource locators (URLs) open), and a session profile title. The session profile record may then be stored in a database 324 as a session profile. The embodiments are not limited to this example.

In one embodiment a powered state of a device 102-a, 104-b, 106-c may represent whether a particular device 102-a, 104-b, 106-c is powered on or powered off at the time of session capture. The embodiments are not limited to this example.

In one embodiment a volume state of a device 102-a, 104-b, 106-c may represent the current volume setting of a particular device 102-a, 104-b, 106-c having audio amplifier capabilities. The embodiments are not limited to this example.

In one embodiment a tuned state of a device 102-a, 104-b, 106-c may represent the channel or frequency to which a particular device 102-a, 104-b, 106-c having one or more of an audio tuner, video tuner, or channel selector is currently set. The embodiments are not limited to this example.

In one embodiment the picture settings of a device 102-a, 104-b, 106-c may represent the current picture settings of a particular device 102-a, 104-b, 106-c having video display capabilities. Picture settings may include, but are not limited to, aspect ratio, picture mode (e.g., wide, zoom, full, wide zoom, etc.), brightness, sharpness, tint, contrast, color saturation levels, and genre mode (e.g., movie, sports, animated, etc.). The embodiments are not limited to this example.

In one embodiment the audio settings of a device 102-a, 104-b, 106-c may represent the current picture settings of a particular device 102-a, 104-b, 106-c having video display capabilities. Audio settings may include, but are not limited to, aspect ratio, picture mode (e.g., wide, zoom, full, wide zoom, etc.), brightness, sharpness, tint, contrast, color saturation levels, and genre mode (e.g., movie, sports, animated, etc.). The embodiments are not limited to this example.

In one embodiment the input source for a device 102-a, 104-b, 106-c may represent the current input source setting of a particular device 102-a, 104-b, 106-c. For instance, a television may have several input sources a user can select from including, but not limited to, cable tv mode, satellite tv mode, over-the-air (OTA) mode, and video 2-n mode in which each video mode may be representative of a different input device such as, for instance, a DVD player, a DVR player, a VHS player, or a computer. Similarly, a stereo receiver may have several input sources a user can select from including, but not limited to, CD, phono, tape, MP3, AC3, and DTS. The embodiments are not limited to this example.

In one embodiment the cued state of a program may represent the current point of a program of a particular device 102-a, 104-b, 106-c having video program playback capabilities. For instance, a user may have paused while viewing a movie at the 39 minute mark. The cued state may include this information so that when the session is restored, the movie will be re-cued to the same point. The embodiments are not limited to this example.

In one embodiment the computer device status may represent, but is not limited to, the applications executing in a computer device, tabs open in a computer device, and universal resource locators (URLs) open in a computer device. For instance, a computer device may have been running three (3) applications at the time of the session save. One of the applications may have been a web-browser. The web-browser may have had two different tabs open each displaying the content from a different URL. The computer device status may include this information so that when the session is restored, the computer will be restored accordingly. The embodiments are not limited to this example.

Figure 3D:
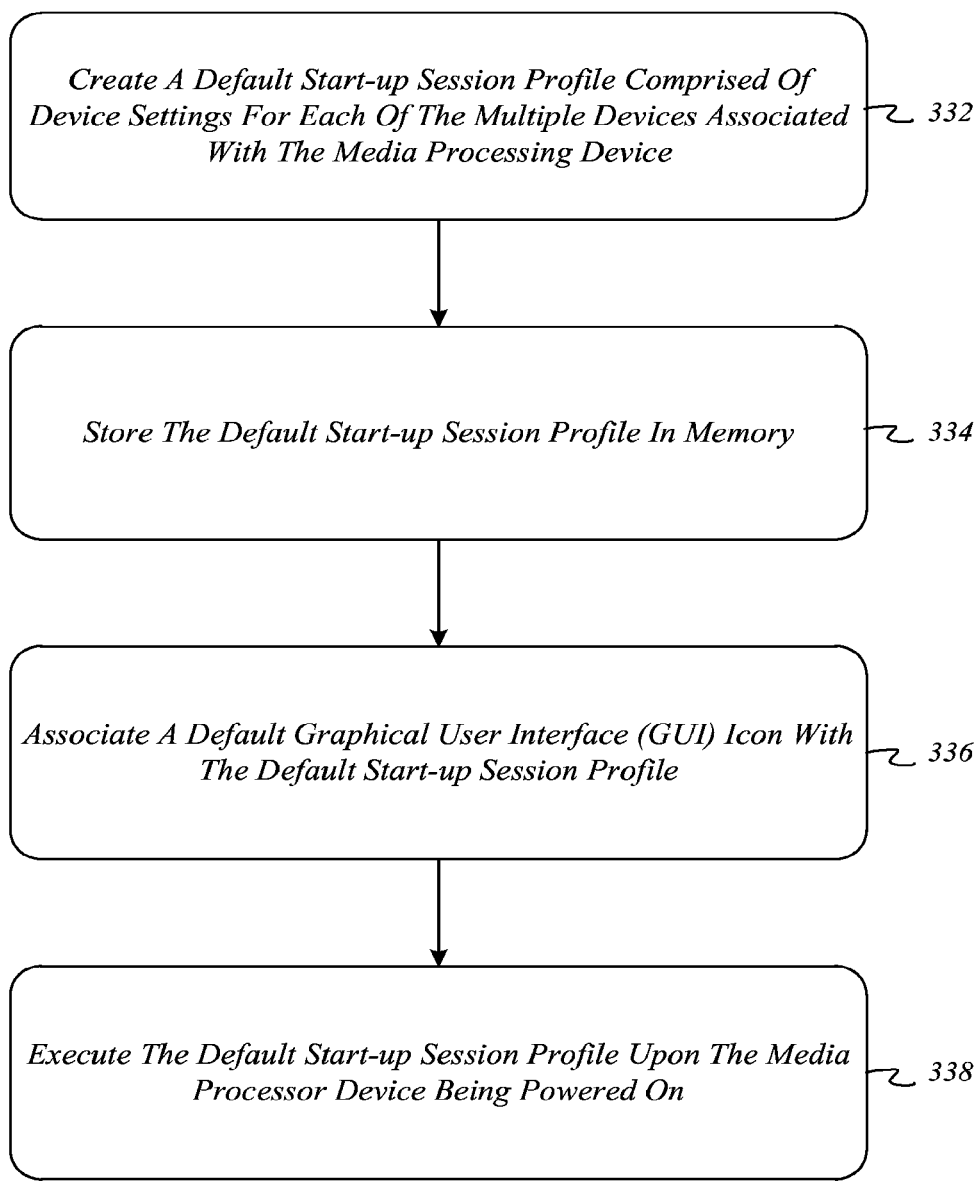
FIG. 3d illustrates one embodiment of a logic flow.

FIG. 3d illustrates one embodiment of a logic flow 330. The logic flow 330 may be representative of some or all of the operations executed by one or more embodiments described herein.

In the illustrated embodiment shown in FIG. 3d, the logic flow 330 may create a default start-up session profile comprised of device settings for each of the multiple devices 102-a, 104-b, 106-c associated with the media processing device 110 at block 332. For example, a user may manually set each device 102-a, 104-b, 106-c to a preferred default setting for an overall home entertainment system. Once each device 102-a, 104-b, 106-c has been adjusted to its preferred default settings, a user can initiate a session save as previously described above. The session will be captured and can be set as the default start-up session. The embodiments are not limited to this example.

The logic flow 330 may store the default start-up session profile in memory 125 at block 334. For example, the default start-up session can be stored in memory as previously described with reference to FIG. 3a. The embodiments are not limited to this example.

The logic flow 330 may associate a default graphical user interface (GUI) icon with the default start-up session profile at block 336. For example, the GUI icon can be specifically labeled "Default" or one of the currently existing session profiles may have its GUI icon highlighted or otherwise emphasized in the display to indicate it is the default session profile. The embodiments are not limited to this example.

The logic flow 330 may execute the default start-up session profile upon the media processor device 110 being powered on at block 338. For example, each time the media processing device 110 is powered on the session capture application 114 can execute a control directive that restores the devices 102-a, 104-b, 106-c of a home entertainment system to their user preferred default status by recalling and invoking the default session profile. The embodiments are not limited to this example.

FIG. 4 illustrates an embodiment of a user interface view 400. The user interface view 400 provides an example of a window or screen appearing in a display 104-1 that may represent the settings of currently operating devices 102-a, 104-b, 106-c of a home entertainment system can be viewed and, if desired, edited. The user interface view 400 may also represent the settings of devices 102-a, 104-b, 106-c of a home entertainment system associated with a currently stored session profile. Thus, a user can select a previous session profile (see FIG. 5 below) and edit individual settings for devices.

In this view, a display 104-1 shows an editable session profile title box 411 as well as boxes representing multiple devices that may be currently in use based on the state of a home entertainment system. For example, a television 412 may be currently in use displaying a movie being played by a DVD player 414. The audio for the movie may be coming from an audio amplifier 416. In addition, a computer 418 may be running a web browser application that may have a window open to a URL providing information about the movie being played. The settings for the devices represented by boxes 412, 414, 416, and 418 may be edited by highlighting a specific box and selecting the "Edit" button 424 described below.

The television 412 may include settings adapted for the movie being played. For instance, the picture settings may include specific levels for color, tint, brightness, etc. The mode setting may be set to DVD to indicate the source of the input signal being displayed. Other settings may be applicable to the television 412 that are not specifically described in this example. The embodiments are not limited to this example.

The DVD player 414 may include settings representing the title of a movie, a cued state of the playback indicating where in the movie viewing has been interrupted, a playback aspect ratio (e.g., 16×9 widescreen, 4×3 standard), or a language setting indicating the language to play the audio. Other settings may be applicable to the DVD player 414 that are not specifically described in this example. The embodiments are not limited to this example.

The audio amplifier 416 may include settings pertaining to the mode of operation, volume level, and Dolby surround sound settings. Other settings may be applicable to the audio amplifier 416 that are not specifically described in this example. The embodiments are not limited to this example.

The computer 418 may include settings pertaining to the applications running, the windows associated with those applications (e.g., a web page being displayed by a web browser). Other settings may be applicable to the computer 418 that are not specifically described in this example. The embodiments are not limited to this example.

The user interface view 400 may also include selectable buttons for managing the user interface and content. For instance, a "Save" button 422, an "Edit" button 424, and a "Show All" button 426 may be selected to perform operations associated therewith. Selecting "Save" 422 may store the device settings for the devices displayed. Selecting "Edit" may switch the user interface view to that described in FIG. 4a below. Selecting "Show All" may switch the user interface view to that described in FIG. 5 below. Other buttons may be implemented by the user interface that are not specifically described in this example. The embodiments are not limited to this example.

In an alternative embodiment, a remote control input device (e.g., 102-1) may include functions for "Save", "Edit", and "Show All" etc. In such a case, the remote control input device 102-1 may select "Save" on the remote control input device 102-1 to issue a control directive to save the current session. Other functions or presentation layouts may be implemented by the user interface that are not specifically described in this example. The embodiments are not limited to this example.

Figure 4A:
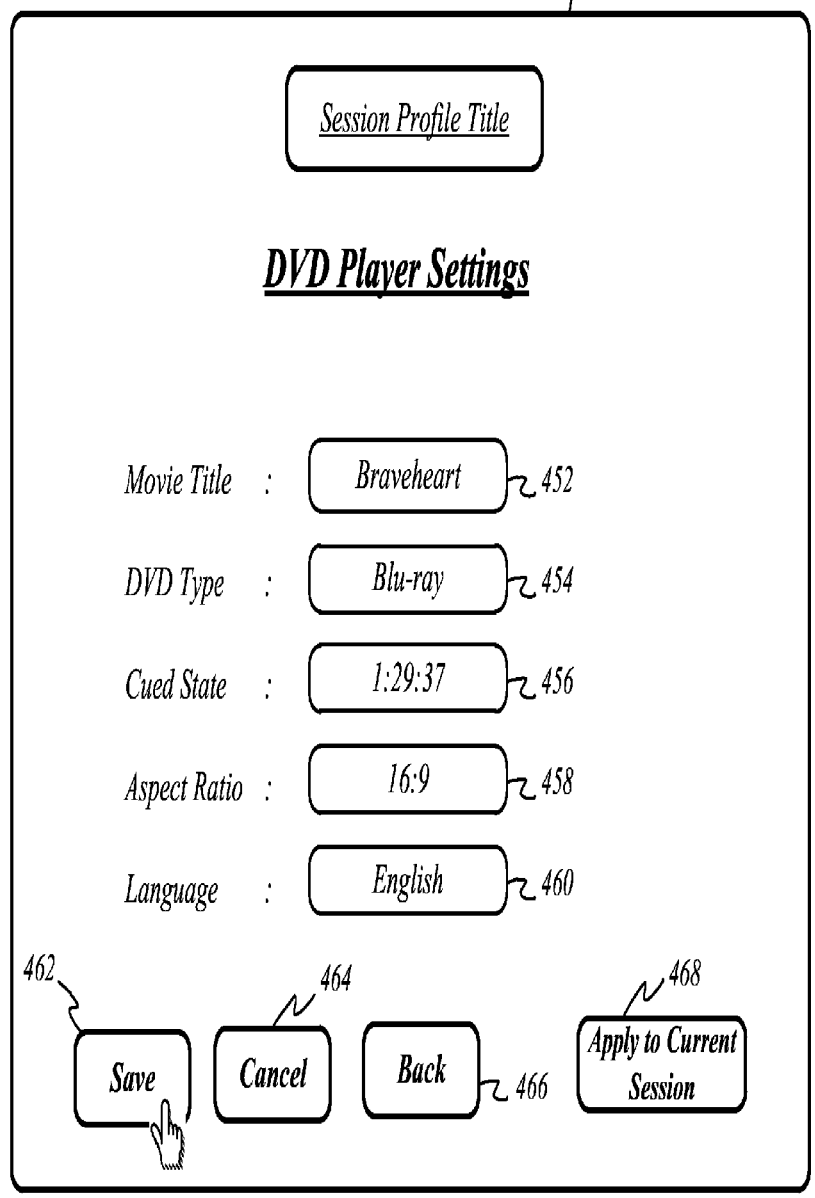
FIG. 4a illustrates an embodiment of a user interface view.

FIG. 4a illustrates an embodiment of a user interface view 450. In this view, a display 104-1 may show the individual settings of the DVD player 414 for a selected session profile. These device settings may be edited by a user. For example, The DVD settings may include five settings representing a movie title 452, a DVD type 454, A cued state 456, an aspect ratio 458, and a language 460. One or more of these DVD settings may be changed by the user by selecting the value corresponding to the label. For instance, the DVD type 454 may be edited from "Blu-ray" to "Standard" via a drop down box or other GUI editing mechanism. Similarly, the cued state may be reset to an earlier or later time. Or, the cued state could be represented in chapters encoded in the DVD and the user could select a chapter rather than a specific time point. The aspect ratio may be changed from "16:9" to "4:3". The language may be changed from "English" to "French".

Once any changes have been effected, the user may select "Save" 462 to cause the session profile to be saved or the changes made to the session profile to be saved. If the session profile already exists, the user may be prompted to overwrite the session profile or save as a new version. The user may also select "Back" 466 to access the user interface view. Other functions, settings, or presentation layouts may be implemented by the user interface that are not specifically described in this example. The embodiments are not limited to this example.

If changes have been made to an active session, the user may select "Apply to Current Session" 468 to cause the device settings to reflect the changes made. Other DVD settings or editing functions may be implemented by the user interface that are not specifically described in this example. In addition, device settings for other devices may be similarly edited. The embodiments are not limited to this example.

FIG. 5 illustrates an embodiment of a user interface view 500. In this view, a display 104-1 shows multiple icons representing different saved sessions. Each icon is associated with a different session and may be selected to restore the various devices to the settings saved in the session profile associated with the icon. A remote control input device 102-1 may navigate about the screen to highlight an icon of interest. In this example there are six icons: Default 512, Sports: Superbowl 514, Movie: Braveheart 516, Animation: Bugs Bunny 518, Audio: Led Zeppelin IV 520, and Computer: Jack's Guitar Amp Search 522a, 522b, 522c. The Animation: Bugs Bunny icon 518 is currently highlighted. A particular session profile may also be comprised of multiple versions as may be shown by icon 522a, 522b, 522c. A selecting icon 540 may be set atop a "Delete" button 532 to indicate that the Animation: Bugs Bunny icon 518 may be deleted if this action is executed. An "Edit" button 534 may, if selected, pop up another user interface view 400 as shown in FIG. 4, for example, with details of the settings associated with the session profile for the icon selected. A "Restore" button 536 may, if selected, initiate instructions or control directives to restore the device settings associated with the selected session profile. Other functions or presentation layouts may be implemented by the user interface that are not specifically described in this example. The embodiments are not limited to this example.

Figure 6:
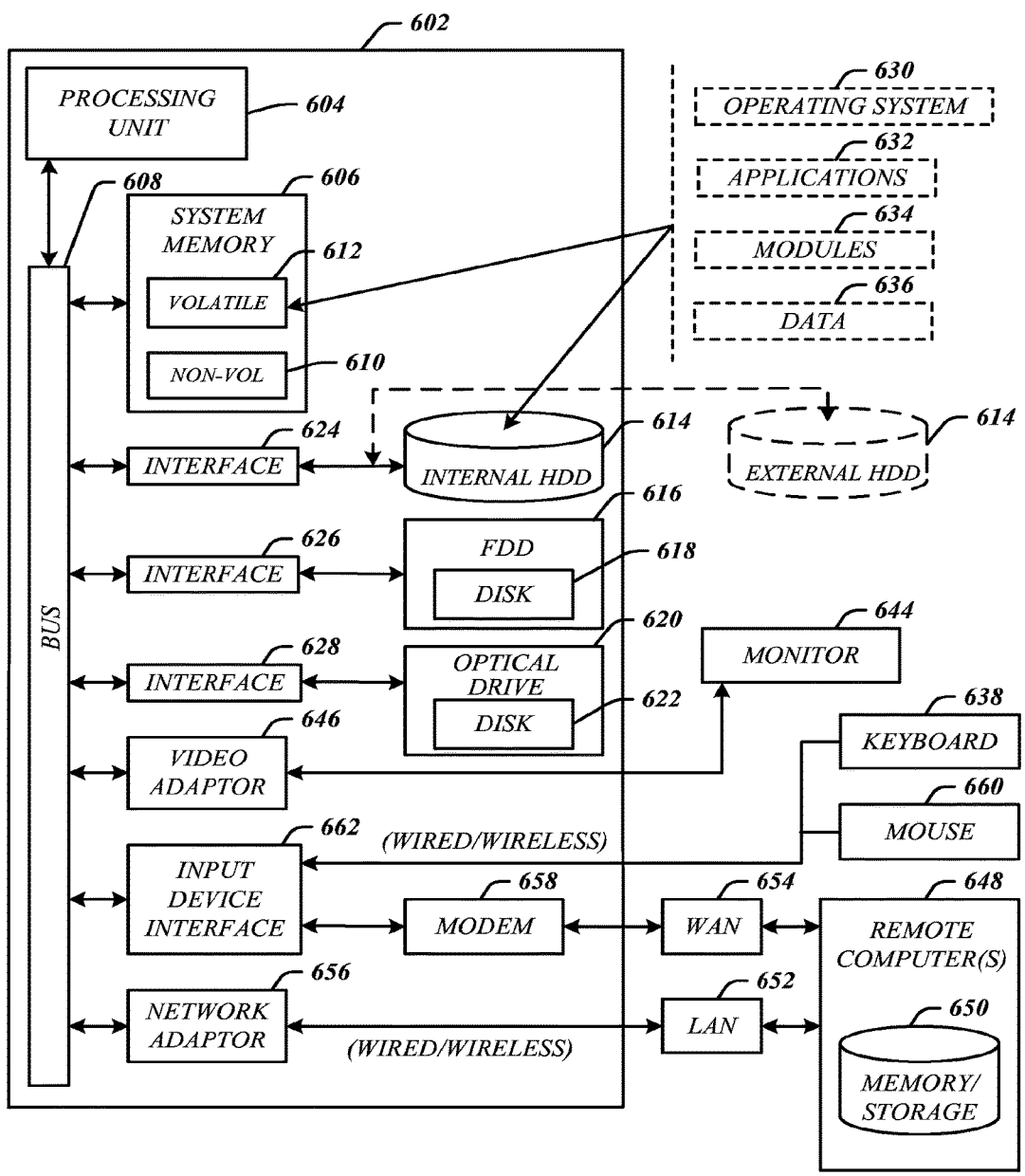
FIG. 6 illustrates one embodiment of a computing architecture.

FIG. 6 illustrates an embodiment of an exemplary computing architecture 600 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 600 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The computing architecture 600 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM, solid state disk (SSD) or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636.

A user can enter commands and information into the computer 602 through one or more wire/wireless input devices, for example, a keyboard 638 and a pointing device, such as a mouse 664. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
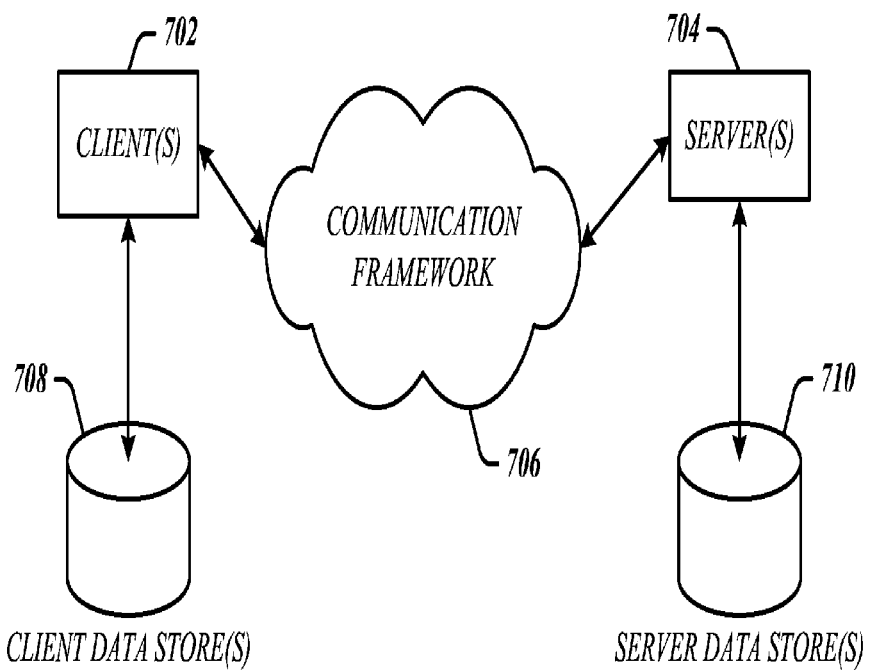
FIG. 7 illustrates one embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques and protocols, such as those described with reference to systems 600. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A media processing device, comprising:
   a communications component arranged to communicate with multiple devices and at least one input device;
   a memory; and
   a processing component communicatively coupled with the memory and communications component, the processing component comprising a session capture application operative on the processing component to:
   initiate a session save of current device settings for the multiple devices that are communicable with the communications component;
   create a session profile representative of the current device settings for the multiple devices;
   store the session profile in the memory;
   create a default start-up session profile to restore the multiple devices to a default status when the media processing device is powered on, the default start-up session profile comprising device settings for each of the multiple devices communicatively coupled with the media processing device;

execute the default start-up session profile responsive to the media processing device being powered on;
present at least one previous session profile on a user interface view;
edit at least one device setting of the at least one previous session profile based on user input received via the user interface view;
create a graphical user interface (GUI) icon;
associate the GUI icon with the session profile stored in memory; and
associate the GUI icon with session title data such that the GUI icon includes the session title data when displayed,
the at least one previous session profile comprising a plurality of versions of a session profile,
the plurality of versions of the session profile grouped together in association with the GUI icon including the session title data when displayed.

2. The media processing device of claim 1, the session capture application operative on the processing component to write the data representative of the current device settings to a session profile record comprised of fields representative of device settings.

3. The media processing device of claim 2 wherein the fields representative of device settings include data representative of a powered state of a device, a volume state of a device, a tuned state of a device, picture settings of a device, a device mode, a cued state of a program, applications executing in a computer device, tabs open in a computer device, or universal resource locators (URLs) open in a computer device.

4. The media processing device of claim 1, the session capture application operative on the processing component to:
store the default start-up session profile in memory; and
associate a default graphical user interface (GUI) icon with the default start-up session profile.

5. The media processing device of claim 1, the current device settings comprising a cued state of a program.

6. The media processing device of claim 1, the current device settings comprising one of applications executing in a computer device, tabs open in a computer device, and universal resource locators (URLs) open in a computer device.

7. A method, comprising:
initiating a session save of current device settings for multiple devices communicable with a communications component of a media processing device;
creating a session profile representative of the current device settings for the multiple devices;
storing the session profile in a memory;
create a default start-up session profile to restore the multiple devices to a default status when the media processing device is powered on, the default start-up session profile comprising device settings for each of the multiple devices; and
executing the default start-up session profile responsive to the media processing device being powered on;
presenting at least one previous session profile on a user interface view;
editing at least one device setting of the at least one previous session profile based on user input received via the user interface view;
creating a graphical user interface (GUI) icon;
associating the graphical user interface (GUI) icon with the session profile stored in memory; and
associating the GUI icon with session title data such that the GUI icon includes the session title data when displayed;
the at least one previous session profile comprising a plurality of versions of a session profile,
the plurality of versions of the session profile grouped together in association with the GUI icon including the session title data when displayed.

8. The method of claim 7 wherein creating a session profile comprises writing data representative of the current device settings to a session profile record comprised of fields representative of device settings.

9. The method of claim 8 wherein the fields representative of device settings include field data representative of a powered state of a device, a volume state of a device, a tuned state of a device, picture settings of a device, a device mode, a cued state of a program, applications executing in a computer device, tabs open in a computer device, or universal resource locators (URLs) open in a computer device.

10. The method of claim 7 comprising:
storing the default start-up session profile in memory; and
associating a default graphical user interface (GUI) icon with the default start-up session profile.

11. The method of claim 7, the current device settings comprising a cued state of a program.

12. The method of claim 7, the current device settings comprising one of applications executing in a computer device, tabs open in a computer device, and universal resource locators (URLs) open in a computer device.

13. An article of manufacture comprising a computer-readable storage medium containing instructions that when executed enable a system to:
receive a control directive from an input device communicable with a communications component of a media processing device, the control directive operative to initiate a save of the current device settings for multiple devices that are communicable with the communications component;
determine the current device settings for the multiple devices;
create a session profile representative of the current device settings for the multiple devices;
create a default start-up session profile to restore the multiple devices to a default status when the media processing device is powered on, the default start-up session profile comprising device settings for each of the multiple devices communicatively coupled with the media processing device;
execute the default start-up session profile responsive to the media processing device being powered on;
present at least one previous session profile on a user interface view;
edit at least one device setting of the at least one previous session profile based on user input received via the user interface view;
create a graphical user interface (GUI) icon;
associate the graphical user interface (GUI) icon with the session profile stored in memory; and
associate the GUI icon with session title data such that the GUI icon includes the session title data when displayed,
the at least one previous session profile comprising a plurality of versions of a session profile, the plurality of versions of the session profile grouped together in association with the GUI icon including the session title data when displayed.

14. The article of claim 13, comprising instructions that when executed enable the system to write data representative of the current device settings to a session profile record comprised of fields representative of device settings.

15. The article of claim 14, wherein the fields representative of device settings include field data representative of a powered state of a device, a volume state of a device, a tuned state of a device, picture settings of a device, a device mode, a cued state of a program, applications executing in a computer device, tabs open in a computer device, or universal resource locators (URLs) open in a computer device.

16. The article of claim 13, comprising instructions that when executed enable the system to save the session profile in a memory such that the session profile can be subsequently accessed to restore the device settings according to the saved session profile.

17. The article of claim 16, comprising instructions that when executed enable the system to:
 create a graphical user interface (GUI) icon; and
 associate the graphical user interface (GUI) icon associated with the session profile stored in memory.

18. The article of claim 13, comprising instructions that when executed enable the system to:
 store the default start-up session profile in memory; and
 associate a default graphical user interface (GUI) icon with the default start-up session profile.

19. The article of claim 13, the current device settings comprising a cued state of a program.

20. The article of claim 13, the current device settings comprising one of applications executing in a computer device, tabs open in a computer device, and universal resource locators (URLs) open in a computer device.

* * * * *